A. F. DICE.
MEDICATED NEST EGG.
APPLICATION FILED SEPT. 5, 1911.
1,030,056.  Patented June 18, 1912.
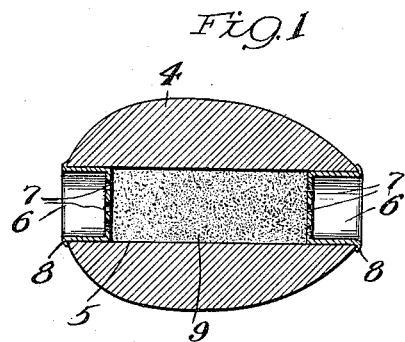
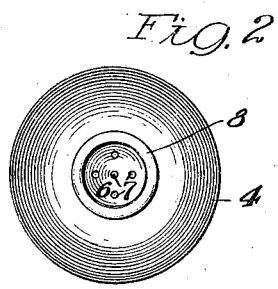  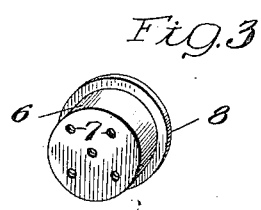
Witnesses:
Inventor:
Andrew F. Dice

UNITED STATES PATENT OFFICE.

ANDREW F. DICE, OF JOLIET, ILLINOIS.

MEDICATED NEST-EGG.

1,030,056.      Specification of Letters Patent.      Patented June 18, 1912.

Application filed September 5, 1911. Serial No. 647,625.

*To all whom it may concern:*

Be it known that I, ANDREW F. DICE, a citizen of the United States, residing in Joliet, in the county of Will and State of Illinois, have invented a new and useful Improvement in Medicated Nest-Eggs, of which the following is a specification.

This invention relates to the construction of medicated nest eggs, a type of which is shown in Patent No. 817,573.

My improvement is intended to furnish poultrymen with a cheap and simple construction in which the medicated compound may be placed and from which it may be fed by the movements imparted to it by the hen.

The nature of the invention is fully disclosed in the following description and also in the accompanying drawing forming a part of such description.

In said drawing Figure 1 is a longitudinal section of the invention. Fig. 2 is an end elevation. Fig. 3 is a perspective of one of the thimbles by which the medicated compound is confined.

In the drawing, 4 represents the body of the egg, which is desirably made of wood in the form of the natural egg and colored in imitation of the same by painting or staining the wood. I prefer wood as the material for the body because it does not become so cold in cold weather as to attract the attention of the hen or lead her to seek another nest, being preferable in this respect to the glass or china imitations heretofore used. The axial center of the body is bored out as shown at 5, preferably from end to end as shown, and in the opening thus formed I insert at each end thimbles 6. These thimbles fit closely in the bore so that they are secure therein, and the inner end 7, of each thimble is perforated as shown, and the outer ends are flanged as at 8, preventing any escape of the medicated powder except through the perforations of 7. The medicated compound in the form of a powder is placed within the bore and confined therein between the thimbles as shown at 9, so that small quantities of it will escape through the perforations when the egg is moved by the hen.

By locating the perforations at the inner ends of the thimbles, they are prevented from becoming clogged or obstructed so as to prevent the desired free escape through them of the powder from within the egg and there is little liability of outside foreign matter getting into the powder. Also by providing thimbles with perforations at both ends of the bore, the air is free to move through the egg and thus prevent accumulations of moisture in it, so that the medicated mixture retains its powdery condition instead of becoming lumpy and caked.

Although I have shown the central bore of the egg as extending entirely through it, it will be understood that that feature is not necessary, as the thimble as shown can be used where the bore is open at one end only.

It will be noted that when the egg is moved by the hen, the escaping powder falls to the floor of the nest and not against or upon any real eggs which may be in the nest. Owing to this feature, the invention is especially useful under sitting hens, as no injury is done by the powder to the real eggs which may be in the nest because while the hen moves all the eggs frequently, she thereby causes the discharge of the powder to the floor of the nest where it does not come against the absorbent shells of the real eggs.

I claim:

The ventilated and medicated nest egg made of rigid material having its axis bored out from end to end and also having removable thimbles with perforated ends inserted at each end of such bore, the perforated ends of the thimbles being located within the bore at a considerable distance from the orifices so that they serve to ventilate the bore while confining and regulating the discharge of the powder.

ANDREW F. DICE.

Witnesses:
  H. M. MUNDAY,
  EDW. S. EVARTS.

---

Copies of this patent may be obtained for five cents each, by addressing the "Commissioner of Patents, Washington, D. C."